US010463984B2

(12) United States Patent
Mukaida et al.

(10) Patent No.: US 10,463,984 B2
(45) Date of Patent: Nov. 5, 2019

(54) EVAPORATOR

(71) Applicant: KANSAI CHEMICAL ENGINEERING CO., LTD., Amagasaki-shi, Hyogo (JP)

(72) Inventors: Tadahiro Mukaida, Amagasaki (JP); Hiroshi Yamaji, Amagasaki (JP); Hideo Noda, Amagasaki (JP)

(73) Assignee: Kansai Chemical Engineering Co., Ltd., Hyogo (JP)

(*) Notice: Subject to any disclaimer, the term of this patent is extended or adjusted under 35 U.S.C. 154(b) by 58 days.

(21) Appl. No.: 15/552,334

(22) PCT Filed: Aug. 30, 2016

(86) PCT No.: PCT/JP2016/075312
§ 371 (c)(1),
(2) Date: Jan. 2, 2018

(87) PCT Pub. No.: WO2017/043368
PCT Pub. Date: Mar. 16, 2017

(65) Prior Publication Data
US 2018/0117493 A1 May 3, 2018

(30) Foreign Application Priority Data

Sep. 7, 2015 (JP) ................................. 2015-176142

(51) Int. Cl.
B01D 1/22 (2006.01)
B01D 5/00 (2006.01)
(Continued)

(52) U.S. Cl.
CPC ............ B01D 1/223 (2013.01); B01D 5/006 (2013.01); B01F 7/00633 (2013.01); B01F 7/18 (2013.01);
(Continued)

(58) Field of Classification Search
CPC . B01D 1/00; B01D 1/22; B01D 1/223; B01D 5/006; B01F 7/00633; B01F 7/18; B01F 15/066; B01F 2015/062
See application file for complete search history.

(56) References Cited

U.S. PATENT DOCUMENTS 2,538,540 A * 1/1951 Thurman ................. B01D 1/22
202/187
2,606,146 A 8/1952 Lulten, Jr.
(Continued)

FOREIGN PATENT DOCUMENTS

JP 4-341303 A 11/1992
JP 4341303 A 11/1992
(Continued)

OTHER PUBLICATIONS

International Search Report and Written Opinion received in PCT/JP2016/075312 dated Oct. 25, 2016.

Primary Examiner — Youngsul Jeong
Assistant Examiner — Gabriel E Gitman
(74) Attorney, Agent, or Firm — Ajay A. Jagtiani; Miles & Stockbridge P.C.

(57) ABSTRACT

An evaporator of the present invention includes an agitation vessel having a volatile component outlet and a concentrate outlet and configured to receive a raw material liquid, a heat source provided inside the agitation vessel, a liquid distributing portion provided within the agitation vessel and configured to cause the raw material liquid to flow down the heat source, and a first condenser provided on an outer circumference of the agitation vessel and configured to cool an inner wall of the agitation vessel. The evaporator of the present invention is useful in, for example, the concentration of various liquid chemicals and chemical products and the removal of volatile impurities from these chemicals and chemical products.

9 Claims, 13 Drawing Sheets

(51) Int. Cl.
*B01F 7/00* (2006.01)
*B01F 7/18* (2006.01)
*B01F 15/06* (2006.01)

(52) U.S. Cl.
CPC ...... *B01F 15/066* (2013.01); *B01F 2015/062* (2013.01)

(56) References Cited

U.S. PATENT DOCUMENTS

| | | | | |
|---|---|---|---|---|
| 4,167,454 | A * | 9/1979 | Feres | B01D 1/222 159/6.1 |
| 4,584,064 | A | 4/1986 | Ciais et al. | |
| 7,011,708 | B2 * | 3/2006 | Noda | B01D 9/0013 117/200 |
| 8,608,911 | B2 * | 12/2013 | Ingeson | B01D 1/223 202/238 |
| 2003/0190271 | A1 | 10/2003 | Noda et al. | |
| 2013/0284579 | A1 | 10/2013 | Corredores et al. | |

FOREIGN PATENT DOCUMENTS

| | | | |
|---|---|---|---|
| JP | 2000-271404 | A | 10/2000 |
| JP | 2000271404 | A | 10/2000 |
| JP | 2006-17330 | A | 1/2006 |
| JP | 200617330 | A | 1/2006 |
| WO | 02/26374 | A1 | 4/2002 |
| WO | 02026374 | A1 | 4/2002 |
| WO | 2016143776 | A1 | 9/2016 |

\* cited by examiner

[Figure 8]
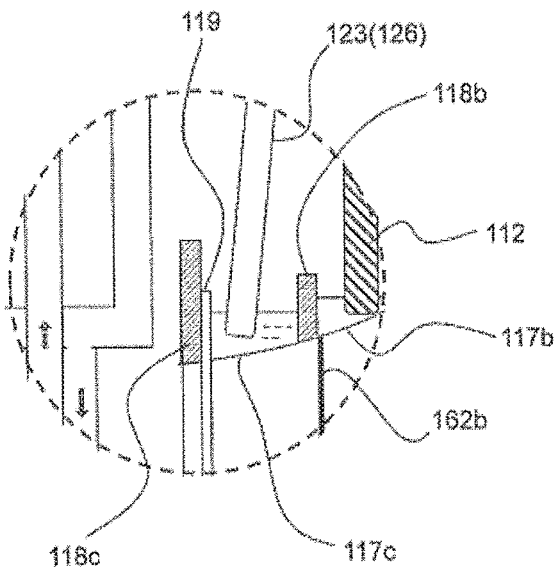
[Figure 9]
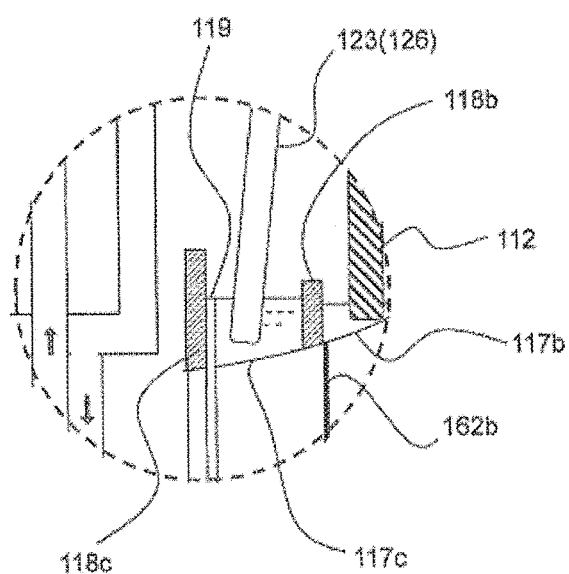

[Figure 10]
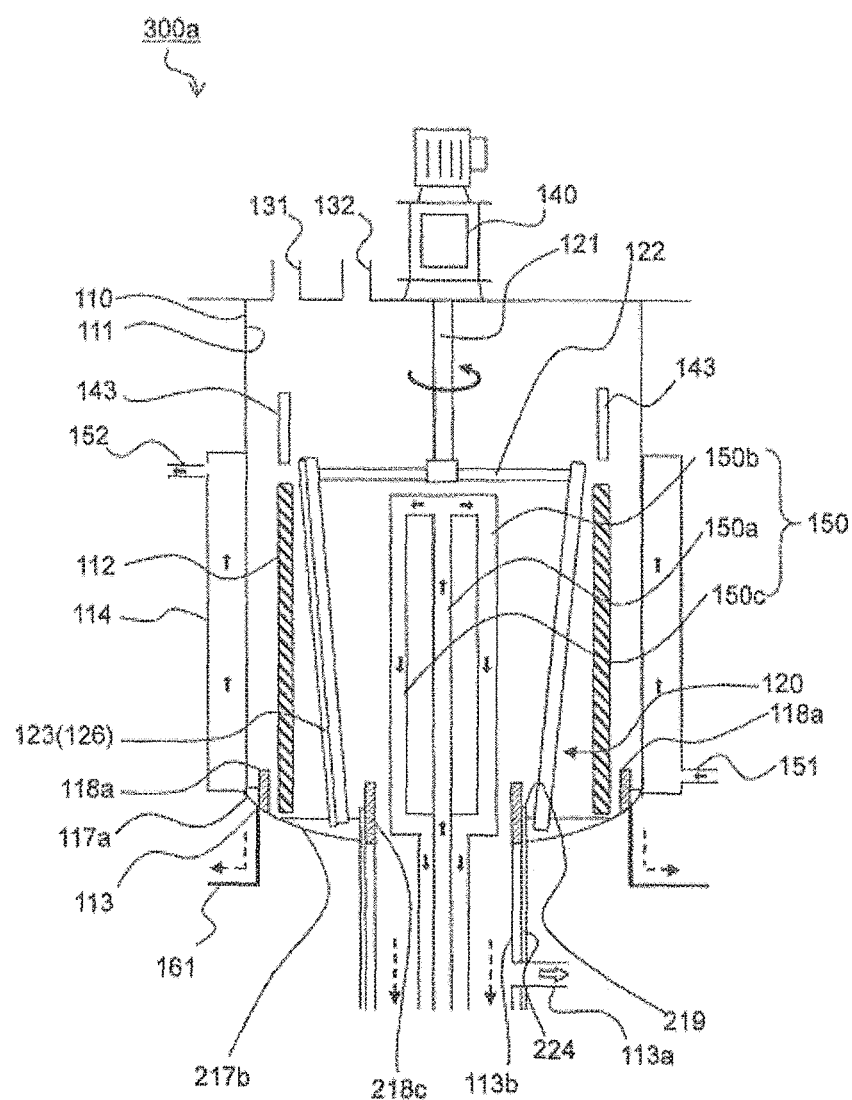

[Figure 11]
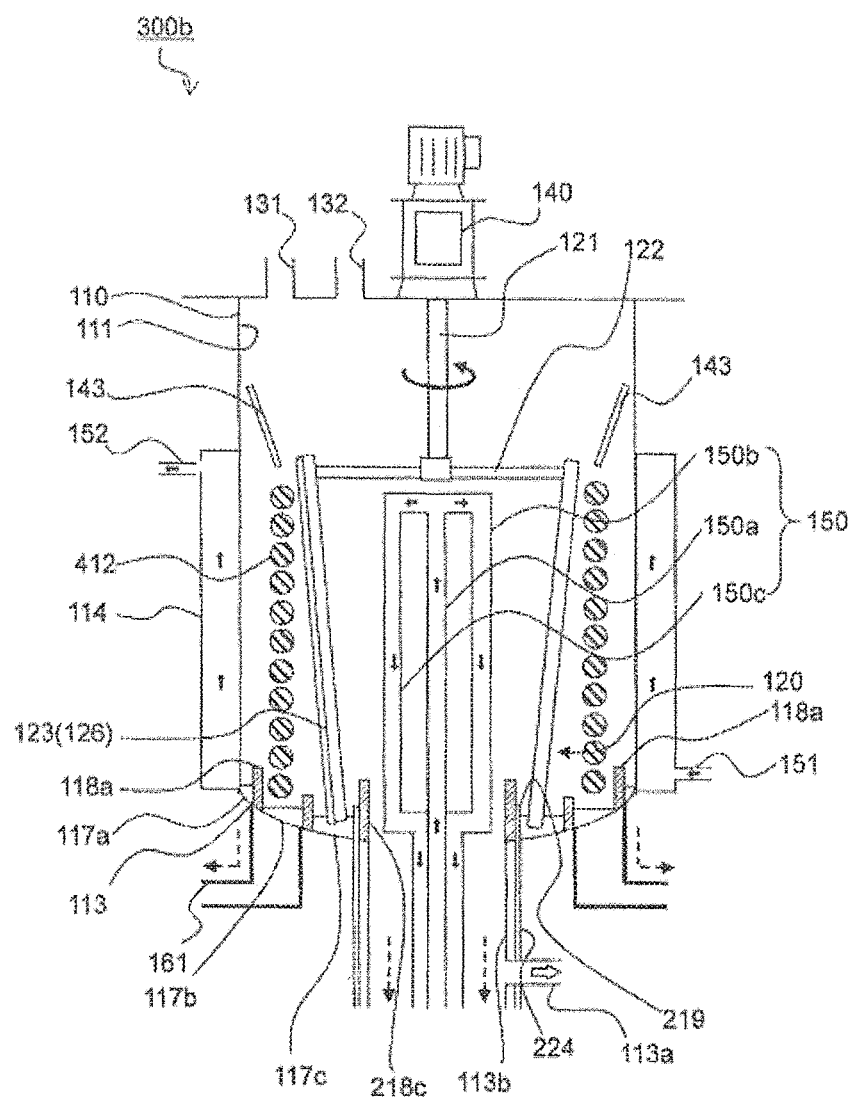

[Figure 12]
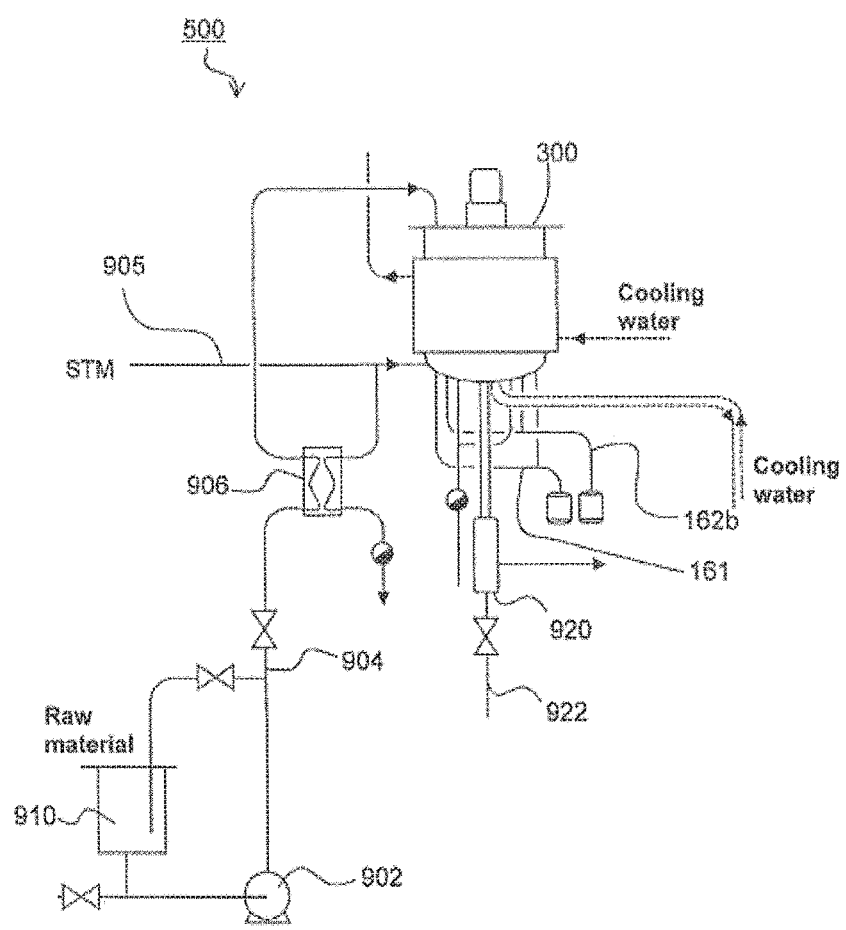

[Figure 13]
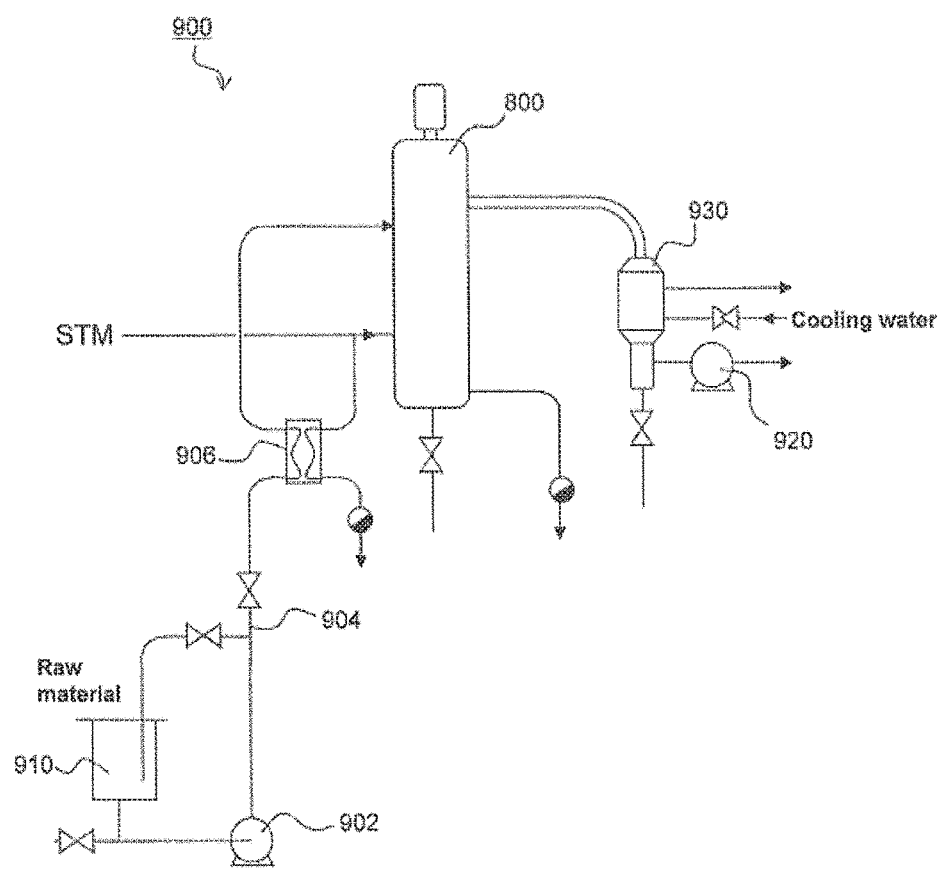

[Figure 14]
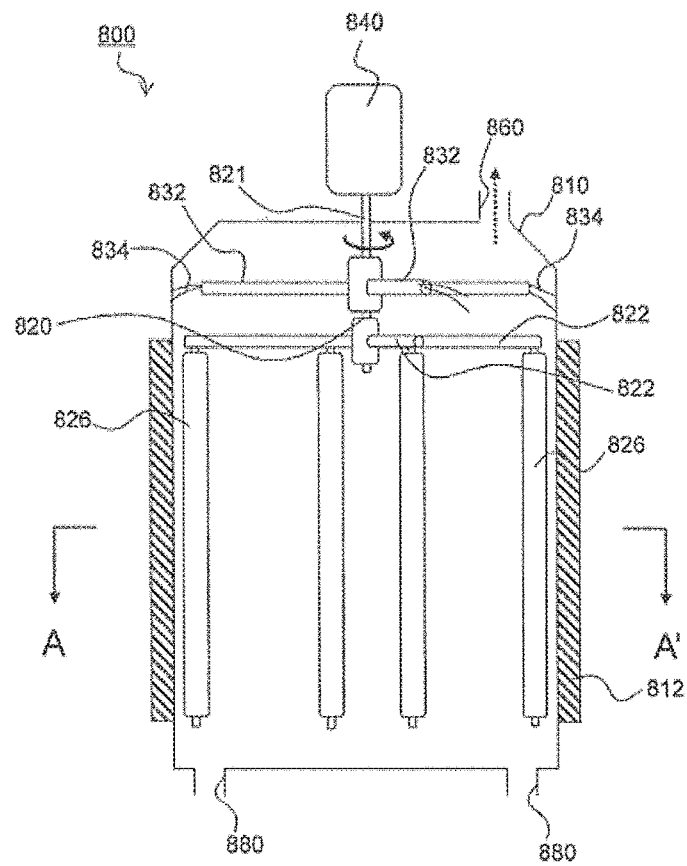
[Figure 15]
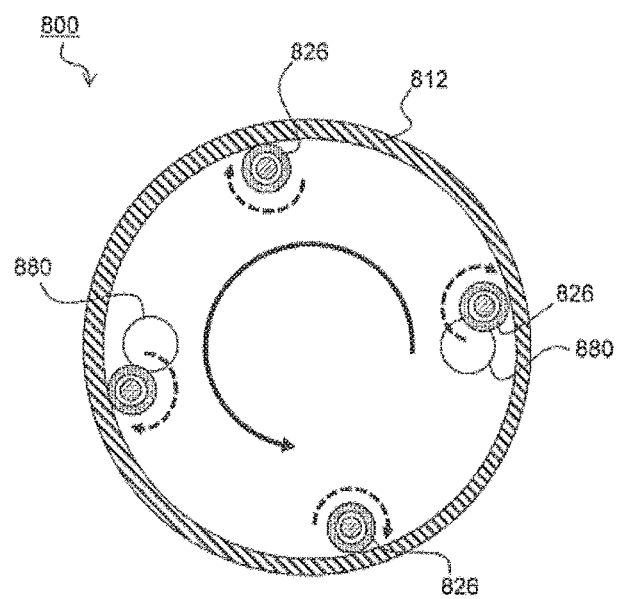

EVAPORATOR

TECHNICAL FIELD

The present invention relates to an evaporator, and more specifically relates to an evaporator with which solvent recovery from and concentration of a liquid can be efficiently performed.

BACKGROUND ART

In the food industry, the chemical industry, and the pharmaceutical industry fields, for example, a type of evaporator called "falling film evaporator" is used to recover a solvent from a liquid containing foreign substances and impurities or to concentrate the liquid.

FIG. 13 is a diagram schematically showing an evaporation system including a conventional falling film evaporator.

An evaporation system 900 includes a raw material tank 910 containing a raw material liquid serving as a raw material, a falling film evaporator 800, a vacuum pump 920, and a condenser 930. The raw material liquid is caused to flow from the raw material tank 910 to a preheater 906 through a conduit 904 by driving of a pump 902, temporarily preheated in the preheater 906, and then fed to the evaporator 800.

FIG. 14 is a diagram schematically showing a portion of a cross section of the evaporator 800 constituting the evaporation system shown in FIG. 13.

As shown in FIG. 14, the evaporator 800 includes an agitation vessel 810, a rotating shaft 821 extending in the vertical direction within the agitation vessel 810 and being rotatable in the horizontal direction, a plurality of supports 822 individually extending in the horizontal direction from the rotating shaft 821 in an upper portion and a lower portion of the agitation vessel 810, and rollers 826 extending downward from the respective supports 822 and being provided so as to come into contact with an inner wall of the agitation vessel 810. The rotating shaft 821 is connected to a driving motor portion 840.

A raw material liquid 834 fed from the raw material tank is supplied to an upper portion of the inner wall of the agitation vessel 810 through supply ports 832 extending in the horizontal direction from the rotating shaft 821, while being rotated as per driving of the driving motor portion 840. After that, the raw material liquid 834 flows downward along the inner wall of the agitation vessel 810 while forming a wet surface. On the other hand, an outer circumference of the agitation vessel 810 is covered by a jacket 812 that can be heated by steam, for example. Here, when the jacket 812 is heated, the heat is transferred from the outer circumference to the inner wall of the agitation vessel 810 and causes a volatile component contained in the raw material liquid 934 flowing down the inner wall while forming a wet surface to evaporate. The evaporated volatile component is fed to the condenser 930 (FIG. 13) provided outside the evaporator 800 through a vapor outlet 860. The volatile component is cooled in the condenser 930, then returns to the liquid state, and is finally collected as a condensate. On the other hand, in FIG. 14, components contained in the raw material liquid other than the above-described volatile component flow down the inner wall of the agitation vessel 810 as is, and are discharged to the outside of the evaporator 800 through discharge ports 880 provided in a bottom portion of the agitation vessel 810.

While the raw material liquid flows down within the agitation vessel 810 as described above, the driving motor portion 840 drives the rollers 826 provided on the respective supports 822 to circle along the inner wall of the agitation vessel 810 while being in contact therewith.

FIG. 15 is a diagram schematically showing a cross section of the conventional evaporator 800 shown in FIG. 14 taken in the direction A-A'. In the evaporator 800, the rollers 826 are in contact with and circle along the inner wall of the agitation vessel 810 heated by the jacket 812, thereby forcibly subjecting the raw material liquid present on a heat transfer surface of the inner wall to surface renewal, and thus, the evaporation efficiency can be increased. Although FIG. 15 shows that the rollers 826 are provided, there are also conventional evaporators in which wipers are provided instead of the rollers 826.

However, some matters of concern have been pointed out with respect to such evaporators.

One of those matters is that the supplied raw material liquid passes down the inner wall (heat transfer surface) within the agitation vessel by flowing down only once through a so-called "one path". Also, in the case where the raw material liquid contains a large amount of a volatile component or in the case where the volatile component cannot be sufficiently evaporated while the raw material liquid flows down the inner wall, it is considered that the remaining component is discharged through the discharge ports 880 as is. For this reason, it has been recognized that the use of the above-described evaporator for a raw material liquid that is required to be sufficiently concentrated is difficult.

Moreover, the rollers 826 such as those shown in FIG. 15 or wipers are continuously in contact with the heat transfer surface and are thus likely to wear out. For this reason, regular replacement is required, and it has been pointed out that the working hours, labor, and costs for maintenance increase accordingly.

Furthermore, it has been pointed out that, in the case where the evaporator is to be stopped, since the temperature of the inner wall is higher than the liquid temperature, if the supply of the raw material liquid is stopped as is, the rollers or the wipers, which are in contact with the inner wall, will deform or deteriorate due to high heat. For this reason, when the evaporator is to be stopped, it is necessary to continue the supply of the raw material liquid or the circulation of a product within the agitation vessel until the temperature of the inner wall decreases.

SUMMARY OF THE INVENTION

Problem to be Solved by the Invention

The present invention was made to address the above-described problems, and it is an object thereof to provide an evaporator with which a volatile component can be more efficiently evaporated from a raw material liquid, and liberation from the troublesomeness of maintenance and repair can be achieved.

Means for Solving the Problem

The present invention provides an evaporator comprising:
an agitation vessel having a raw material liquid supply port, a volatile component outlet, and a concentrate outlet and being configured to receive a raw material liquid;
a heat source provided inside the agitation vessel;
a liquid distributing portion provided within the agitation vessel and configured to cause the raw material liquid to flow down the heat source; and a first condenser provided on an outer circumference of the agitation vessel and configured to cool an inner wall of the agitation vessel, wherein the agitation vessel includes a volatile component receiving portion configured to receive a volatile component of the raw material liquid, the volatile component receiving portion being surrounded by a bottom portion of the agitation vessel, the inner wall, and an outer partition wall portion and being in communication with the volatile component outlet, and the liquid distributing portion is constituted by a rotating shaft and at least one gutter-shaped member having a flow passage through which, as the rotating shaft rotates, the raw material liquid flows upward from a lower side of the agitation vessel, and being mounted to the rotating shaft.

In one embodiment, the agitation vessel includes:
a first raw material liquid receiving portion configured to receive the raw material liquid that has flowed down from the heat source, the first raw material liquid receiving portion being surrounded by the bottom portion of the agitation vessel, the outer partition wall portion, and an intermediate partition wall portion and being in communication with the concentrate outlet; and
a second raw material liquid receiving portion configured to receive the raw material liquid that has overflowed from the first raw material liquid receiving portion, the raw material liquid mixture receiving portion being surrounded by the bottom portion of the agitation vessel, the intermediate partition wall portion, and an inner partition wall portion, and the volatile component receiving portion, the first raw material liquid receiving portion, and the second raw material liquid receiving portion are arranged in this order from an outer edge toward the center of the bottom portion of the agitation vessel.

In one embodiment, the agitation vessel includes:
a raw material liquid receiving portion configured to receive the raw material liquid that has flowed down from the heat source, the raw material liquid receiving portion being surrounded by the bottom portion of the agitation vessel, the outer partition wall portion, and an inner partition wall portion and being in communication with the concentrate outlet, and the volatile component receiving portion and the raw material liquid receiving portion are arranged in this order from an outer edge toward the center of the bottom portion of the agitation vessel.

In one embodiment, the evaporator of the present invention further comprises a second condenser that is provided inward of a rotation path of the liquid distributing portion inside the agitation vessel.

In one embodiment, in the bottom portion of the agitation vessel, a second volatile component outlet is provided below the second condenser.

In one embodiment, the inner wall of the agitation vessel, the heat source, and the second condenser are provided in a vertical direction substantially parallel to one another, and the shortest distance from the inner wall to the heat source and the shortest distance from the heat source to the second condenser are substantially equal to each other.

In one embodiment, the second raw material liquid receiving portion is provided with a raw material liquid discharge conduit that is open at a position below an upper end portion of the inner partition wall portion.

In one embodiment, a plurality of the gutter-shaped members are mounted to the rotating shaft via an attachment member extending in a direction that is perpendicular to an axial direction of the rotating shaft, and the gutter-shaped members form substantially equal angles with the attachment member.

The present invention also provides an evaporation system comprising:
a raw material tank configured to contain a raw material liquid; and
the above evaporator which is configured to process the raw material liquid supplied from the raw material tank.

Effects of the Invention

According to the present invention, the volatile component can be efficiently evaporated from the raw material liquid without using a member such as a roller or a wiper. Thus, an efficiently concentrated concentrate can be prepared from the raw material liquid. Furthermore, according to the present invention, the possibility of the occurrence of seizure of a member within the agitation vessel can be avoided.

BRIEF DESCRIPTION OF DRAWINGS

FIG. 8 is an enlarged view showing the vicinity of a raw material liquid mixture receiving portion of the evaporator shown in FIG. 7, in order to explain a state in which a raw material liquid is received in a portion of the raw material liquid mixture receiving portion.

FIG. 9 is an enlarged view showing the vicinity of the raw material liquid mixture receiving portion of the evaporator shown in FIG. 7, in order to explain how the inside of the raw material liquid mixture receiving portion is completely filled with the raw material liquid, and the raw material liquid overflows to the outside of the agitation vessel through a raw material discharge conduit.

FIG. 10 is a schematic diagram showing yet another example of the evaporator of the present invention.

FIG. 11 is a schematic diagram showing yet another example of the evaporator of the present invention.

FIG. 12 is a diagram schematically showing an evaporation system including the evaporator of the present invention.

FIG. 13 is a diagram schematically showing an evaporation system including a conventional falling film evaporator.

FIG. 14 is a diagram schematically showing a portion of a cross section of an evaporator 800 constituting the evaporation system shown in FIG. 13.

FIG. 15 is a diagram schematically showing a cross section of the conventional evaporator shown in FIG. 14 taken in the direction A-A'.

MODES FOR CARRYING OUT THE INVENTION

An evaporator of the present invention will be described with reference to the accompanying drawings.

Figure 1:
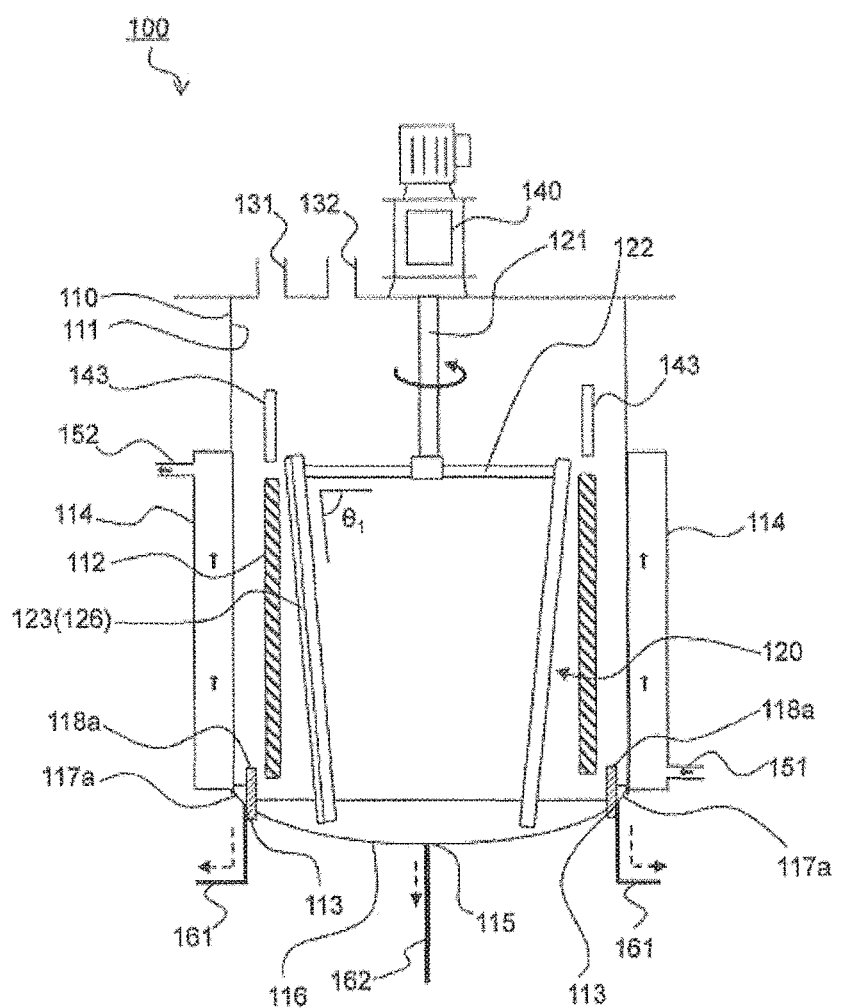
FIG. 1 is a schematic diagram showing an example of an evaporator of the present invention.

FIG. 1 is a schematic diagram showing an example of the evaporator of the present invention. An evaporator 100 in FIG. 1 includes an agitation vessel 110 in which a raw material liquid is received, a heat source 112 provided inside the agitation vessel 110, and a first condenser 114 that is provided on an outer circumference of the agitation vessel 110 and capable of cooling an inner wall 111 of the agitation vessel 110.

The agitation vessel 110 is a sealable vessel in which a liquid, such as an aqueous solution or slurry, can be received and agitated, and has a bottom portion 116 that is flat bottom shaped, round bottom shaped, or cone bottom shaped or that slopes downward.

The size (capacity) of the agitation vessel 110 can be set as appropriate in accordance with the specific use (e.g., type of raw material liquid to be supplied) of the evaporator 100, the amount of raw material liquid to be processed, and the like, and is therefore not necessarily limited, but may be 0.1 liters to 100,000 liters, for example. The material composing the agitation vessel 110 is not limited; however, it is preferable that the agitation vessel 110 is composed of a metal, such as iron, stainless steel, titanium, Hastelloy, or copper, because, for example, these metals are stable to various types of raw material liquids, have excellent thermal conductivity, and/or can be easily obtained and processed. A coating that is known in the art, such as Teflon (registered trademark), a glass lining, or a rubber lining, may be applied to the inner wall 111 of the agitation vessel 110 in order to improve the chemical resistance.

The agitation vessel 110 also has a raw material liquid supply port 131, a volatile component outlet 113, and a concentrate outlet 115.

As shown in FIG. 1, the raw material liquid supply port 131 is provided, for example, in a top portion (e.g., a lid) of the agitation vessel 110, and preferably at a position that enables the supplied raw material liquid to fall into the agitation vessel 110 and come into contact with the heat source 112 or a position that enables the supplied raw material liquid to fall into the agitation vessel 110, temporarily come into contact with a liquid flowing-down plate 143, subsequently fall down the liquid flowing-down plate 143, and then come into contact with the heat source 112. The number of raw material liquid supply ports 131 provided in the agitation vessel 110 is not limited to one. For example, a plurality of raw material liquid supply ports may also be provided in the agitation vessel 110.

In FIG. 1, the volatile component outlet 113 is provided in communication with a bottom portion of a volatile component receiving portion 117a in the agitation vessel 110. The volatile component receiving portion 117a is surrounded by the bottom portion 116 of the agitation vessel 110 (more specifically, a portion of the bottom portion of the agitation vessel 110), the inner wall 111, and a partition wall portion 118a, and is open at the top. The volatile component receiving portion 117a can receive a volatile component (preferably, a liquid volatile component) of the raw material liquid. Furthermore, the volatile component in the volatile component receiving portion 117a can be discharged to the outside as a condensate from a conduit 161 via the volatile component outlet 113.

In FIG. 1, the concentrate outlet 115 is provided in communication with the center of the bottom portion 116 in the agitation vessel 110, for example. The bottom portion in the agitation vessel 110 is capable of receiving the raw material liquid to the height of the top end of the partition wall portion 118a. Here, the term "raw material liquid" as used herein refers to the (untreated) raw material liquid that has fallen without coming into contact with the above-described heat source; the residue after at least a portion of the volatile component has evaporated as a result of coming into contact with the heat source; and a mixture thereof. Furthermore, after the volatile component has evaporated, the raw material liquid can finally be discharged to the outside as a concentrate from a conduit 162 via the concentrate outlet 115. The conduit 162 may also be provided with a valve (not shown), if necessary, and, for example, in a state in which the valve is closed, the raw material liquid can be temporarily received in the bottom portion 116 of the agitation vessel 110.

The top portion of the agitation vessel 110 may also have an openable structure, such as a lid or a maintenance hole, for example. Furthermore, a pressure-reducing port 132 for adjusting the pressure inside the agitation vessel 110 to atmospheric pressure or reducing the pressure inside the agitation vessel 110 may also be provided in the top portion of the agitation vessel 110. The pressure-reducing port 132 is connected to a pressure-reducing pump, which is not shown.

In the evaporator 100 of the present invention, the heat source 112 is provided inside the agitation vessel 110 so as to be, for example, substantially parallel to the inner wall 111. In FIG. 1, the heat source 112 is composed of a hollow material, for example. A heat medium, such as water vapor or heat transfer oil, for example, is introduced into the heat source 112 from the outside of the agitation vessel 110 through a conduit, which is not shown, so that the volatile component can be evaporated from the raw material liquid that has come into contact with an outer surface (heat-providing surface) of the heat source 112. When the raw material liquid comes into contact with the heat source 112, the volatile component of the raw material liquid vaporizes, and diffuses into the agitation vessel 110 as a gas.

It should be noted that, in the embodiment shown in FIG. 1, the heat-providing surface of the heat source 112 is present on both sides (i.e., both the side that faces the inner wall 111 of the agitation vessel 110 and the side that faces the central axis of the agitation vessel 110). Thus, the area of contact with the volatile component increases, and accordingly, the volatile component can be more efficiently evaporated from the raw material liquid. Moreover, having the heat source 112 provided inside the agitation vessel 110 has the advantages of reducing heat loss and making heat retention easy or unnecessary compared with a case where it is provided outside.

The evaporator 100 of the present invention also includes a liquid distributing portion 120 for distributing the raw material liquid received in the center of the bottom portion 116 of the agitation vessel 110 over the heat source 112 to cause the raw material liquid to flow down the heat source 112, the liquid distributing portion 120 being provided inside the agitation vessel 110. The liquid distributing portion 120 is constituted by a rotating shaft 121 and a gutter-shaped member 123 mounted to the rotating shaft 121 via an attachment member 122 extending in a direction that is perpendicular to the axial direction of the rotating shaft 121. When the rotating shaft 121 rotates, the liquid distributing portion 120 can cause the raw material liquid received in the bottom portion 116 to flow upward from a lower side of the agitation vessel 110 through a flow passage 126 provided along the length direction of the gutter-shaped member 123. As a result, the raw material liquid that has been drawn up from the bottom portion of the agitation vessel 110 can be discharged toward, for example, the liquid flowing-down plate 143, which is disposed above the heat source 112. The raw material liquid striking the liquid flowing-down plate 143 falls as is, and thus can be distributed over an upper portion of the heat source 112. Here, the liquid flowing-down plate 143 may be attached at any angle within the agitation vessel 110. Furthermore, the distributed raw material liquid flows downward from the upper portion of the heat source 112, meanwhile, the evaporation of the volatile component can be promoted, and the residue can be received in the bottom portion 116 of the agitation vessel 110 as a concentrate.

The rotating shaft 121 is a shaft composed of a rigid metal, such as iron, stainless steel, Hastelloy, or titanium, and has a cylindrical tube shape or a cylindrical shape, for example. In the agitation vessel 110, the rotating shaft 121 usually is vertically disposed. The thickness of the rotating shaft 121 is not necessarily limited, but may be 8 mm to 200 mm, for example. The length of the rotating shaft 121 varies in accordance with the size and the like of the agitation vessel 110 to be used, and a person skilled in the art can select an appropriate length. A coating that is known in the art, such as Teflon (registered trademark), a glass lining, or a rubber lining, may be applied to the rotating shaft 121 and the liquid distributing portion 120 in order to improve the chemical resistance.

One end of the rotating shaft 121 is connected to rotating means such as a motor 140 above the agitation vessel 110. In FIG. 1, the other end of the rotating shaft 121 is not connected to the bottom portion of the agitation vessel 110 and is disposed at, for example, a position spaced apart from the bottom portion of the agitation vessel 110 by a certain distance. Alternatively, the other end of the rotating shaft may also be received in a bearing that is provided on the bottom portion of the agitation vessel.

In the evaporator 100 shown in FIG. 1, two gutter-shaped members 123 are symmetrically arranged around the axis of the rotating shaft 121, which constitutes the liquid distributing portion 120. Moreover, in FIG. 1, the two gutter-shaped members 123 are attached to the attachment member 122 so as to be inclined at a predetermined angle (also referred to as the angle of inclination of attachment) $\theta_1$ relative to the attachment member 122. The angle of inclination of attachment $\theta_1$ can be set at any angle by a person skilled in the art, and may be 60° to 88.5°, for example, and preferably 75° to 88°.

In the evaporator of the present invention, for example, a plurality of (i.e., one or more), preferably two to eight, and more preferably two to six gutter-shaped members are mounted to the rotating shaft. In the present invention, it is preferable that these gutter-shaped members are mounted substantially equiangularly spaced around the rotating shaft.

Figure 2:
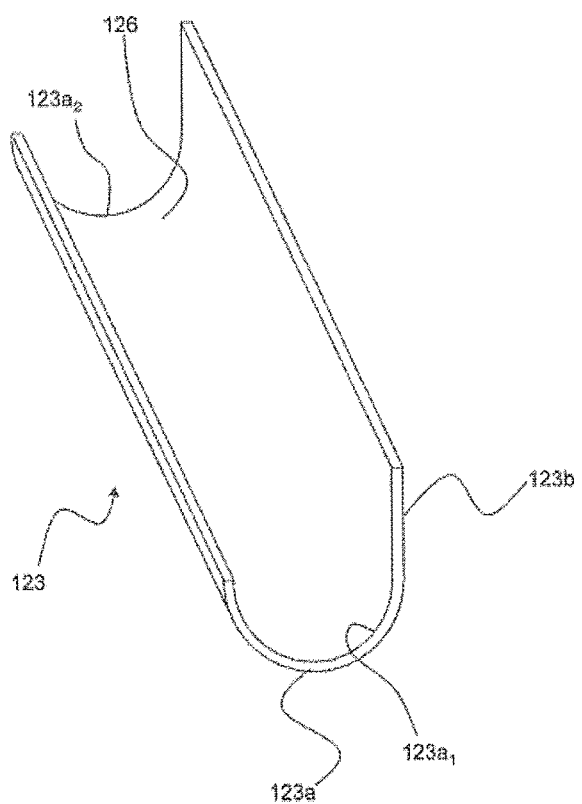
FIG. 2 is a perspective view schematically showing an example of a gutter-shaped member that may be used for a liquid distributing portion constituting the evaporator of the present invention.

In the present invention, the flow passage 126 of each gutter-shaped member 123 may have the form of a so-called half-pipe having a semicylindrical tube shape, a semirectangular tube shape, a V-shape, or the like, for example, or may have a configuration in which a lower end and an upper end thereof have the above-described half-pipe form, and an intermediate portion therebetween is processed into a tube shape (e.g., a cylindrical tube shape, an elliptical tube shape, or a rectangular tube shape). Alternatively, the entirety of the flow passage 126 of each gutter-shaped member 123 may be processed into a tube shape (e.g., a cylindrical tube shape, an elliptical tube shape, or a rectangular tube shape) (the above-described half-pipe form that enables drawing-up of the raw material liquid mixture is realized at the lower end by the above-described angle of inclination of attachment $\theta_1$). Alternatively, the gutter-shaped member 123 may include a plate-like body 123b that is formed by a portion of a semicylinder 123a extending along the longitudinal direction as shown in FIG. 2. In the case where the gutter-shaped member 123 shown in FIG. 2 is used, due to the rotation of the rotating shaft, the raw material liquid mixture is drawn up from a lower end $123a_1$ of the gutter-shaped member 123, and the raw material liquid moves upward to an upper end $123a_2$ of the gutter-shaped member 123 through this rotation. When moving upward, the raw material liquid that has been drawn up is blocked by the plate-like body 123b in spite of the rotation of the gutter-shaped member 123 and thus can be prevented from flying out from the gutter-shaped member 123.

The size of the gutter-shaped member 123 is not limited; however, in the case where a gutter-shaped member having, for example, a semicylindrical tube shape such as that shown in FIG. 2 is used, the diameter of the semicylindrical tube portion may be 2 mm to 200 mm, for example. The length from the lower end $123a_1$ to the upper end $123a_2$ may be 40 mm to 8,000 mm, for example. The width of the plate-like body is not necessarily limited, but may be 20 mm to 300 mm, for example. The gutter-shaped member 123 is composed of for example, a metal such as iron, stainless steel, Hastelloy, or titanium or a material constituted by a combination of these metals. A coating that is known in the art, such as Teflon (registered trademark), a glass lining, or a rubber lining, may be applied to the gutter-shaped member 123 in order to improve the chemical resistance.

In the evaporator 100 of the present invention, the rotation rate (i.e., rotation rate of the liquid distributing portion 120) of the rotating shaft 121 that is suitable for drawing up the raw material liquid within the agitation vessel 110 varies in accordance with the constituent components and the viscosity of the raw material liquid, the size of the agitation vessel 110, the amount of raw material liquid received in the bottom portion 116 of the agitation vessel 110, and the like and is therefore not necessarily limited, but may be 30 rpm to 500 rpm, for example.

Referring again to FIG. 1, the first condenser 114 is provided on the outer circumference of the agitation vessel 110, and preferably provided so as to cover the outer circumference of the agitation vessel 110 in continuous intimate contact therewith.

In the first condenser 114 shown in FIG. 1, a cooling medium such as cooling water is injected through an injection port 151, flows through the first condenser 114, and is discharged to the outside through a discharge port 152. Thus, the temperature of the cooling medium flowing through the first condenser 114 is transferred to the inner wall 111 of the agitation vessel 110, and the inner wall 111 is kept at a low temperature by the cooling medium. On the other hand, the volatile component of the raw material liquid that has evaporated on the heat source 112 is cooled on the inner wall 111, condenses, and flows down the inner wall 111 as liquid droplets. After that, the volatile component of the raw material liquid that has flowed down the inner wall 111 is received in the volatile component receiving portion 117a and discharged to the outside from the conduit 161 through the volatile component outlet 113.

According to the evaporator 100 of the present invention, unlike a conventional inner wall, the inner wall is not heated. For this reason, when the operation of the evaporator is to be stopped, the operation can be stopped in a relatively short period of time without the need to be concerned about seizure of the inner wall of the agitation vessel with the raw material liquid. Also, according to the evaporator of the present invention, it is easy to stop the evaporator itself compared with a conventional evaporator in which the raw material liquid passes down the inner wall in the agitation vessel by flowing down only once through "one path", and the amount of raw material liquid that is used for cooling when the evaporator is to be stopped can also be reduced.

Figure 3:
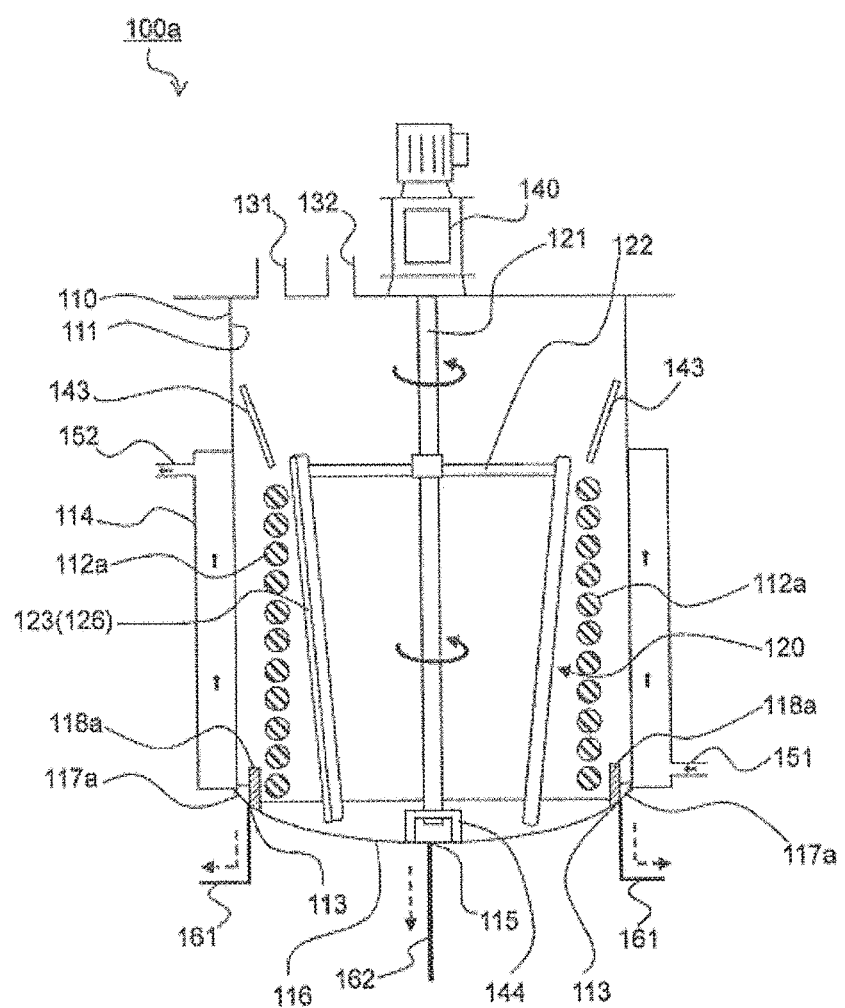
FIG. 3 is a schematic diagram showing another example of the evaporator of the present invention.

FIG. 3 is a schematic diagram showing another example of the evaporator of the present invention.

In an evaporator 100a shown in FIG. 3, constituent elements denoted by the same reference numerals as those shown in the above-described drawings are the same as those shown in the above-described drawings.

The evaporator 100a of the present invention shown in FIG. 3 includes a heat source 112a constituted by a coiled heater, instead of the hollow heat source 112 shown in FIG. 1. Since the heat source 112a is coil-shaped, the area of its heat-providing surface can be increased even more compared with that shown in FIG. 1. Furthermore, the raw material liquid that has flowed down from the liquid flowing-down plate 143 can also freely move between the coil loops constituting the heat source 112a. As a result, the volatile component of the raw material liquid can be more efficiently evaporated. It should be noted that in the evaporator 100a shown in FIG. 3, the other end (lower end) of the rotating shaft 121 is received in a bearing 144 that is provided in the vicinity of the center of the bottom portion of the agitation vessel 110.

Figure 4:
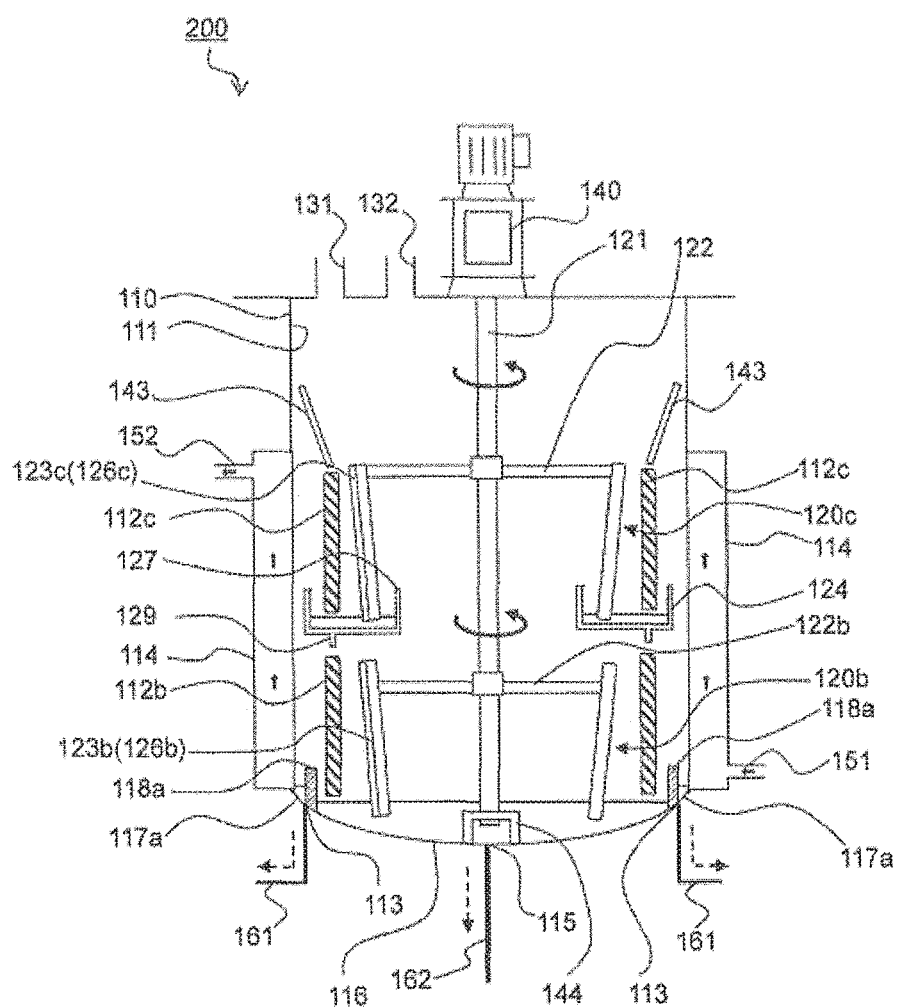
FIG. 4 is a schematic diagram showing yet another example of the evaporator of the present invention.

FIG. 4 is a schematic diagram showing yet another example of the evaporator of the present invention.

In an evaporator 200 shown in FIG. 4, constituent elements denoted by the same reference numerals as those shown in the above-described drawings are the same as those shown in the above-described drawings.

The evaporator 200 shown in FIG. 4 includes, within the agitation vessel 110, liquid distributing portions 120b and 120c that are arranged in two levels in the up-down direction and heat sources 112b and 112c that are arranged in two levels in the up-down direction. Furthermore, in the evaporator 200, in addition to the bottom portion 116 of the agitation vessel 110, an auxiliary storage portion 124 is provided within the agitation vessel 110. The auxiliary storage portion 124 is fixed by, for example, a mounting member (not shown) extending from the inner wall 111. The auxiliary storage portion 124 is open at the top and can, owing to an auxiliary partition wall portion 127 constituting the periphery of the auxiliary storage portion 124, temporarily receive the raw material liquid that has been supplied from the raw material liquid supply port 131 and flowed down the liquid flowing-down plate 143 and the heat source 112c. Furthermore, a protruding portion 129 is provided on a lower surface of the auxiliary storage portion 124, extending downward from a position at which the heat source 112b is provided.

In the evaporator 200 shown in FIG. 4, a pair of first gutter-shaped members 123b is provided in the liquid distributing portion 120b, which is provided on the lower side of the rotating shaft 121, via an attachment member 122b so as to be axially symmetric with respect to the rotating shaft 121. The lower end of each first gutter-shaped member 123c extends to a position at which it can be inserted into the raw material liquid received at the center of the bottom portion 116 of the agitation vessel 110. Also, a pair of second gutter-shaped members 123c is provided in the liquid distributing portion 120c, which is provided on the upper side of the rotating shaft 121, via an attachment member 122c so as to be axially symmetric with respect to the rotating shaft 121. The lower end of each second gutter-shaped member 123c extends to a position at which it can be inserted into the raw material liquid received in the auxiliary storage portion 124.

In the evaporator 200 shown in FIG. 4, the raw material liquid discharged from the raw material liquid supply port 131 first comes into contact with the liquid flowing-down plate 143, and then flows down the heat source 112c. At this time, a portion of the volatile component contained in the raw material liquid evaporates, and the residue flows down the heat source 112c as is and is then temporarily received in the auxiliary storage portion 124 as the raw material liquid.

Furthermore, due to the rotation of the rotating shaft 121, the raw material liquid received in the auxiliary storage portion 124 is drawn up from the lower end to the upper end of the second gutter-shaped members 123c through flow passages 126c in the respective second gutter-shaped members 123c of the liquid distributing portion 120c, then distributed over the liquid flowing-down plate 143 from upper end portions of the second gutter-shaped members 123c, and caused to flow down. While the raw material liquid flows down, an additional portion of the volatile component contained in the raw material liquid is evaporated by the heat source 112c, and the residue flows down the heat source 112c as is and is again received in the auxiliary storage portion 124 as the raw material liquid. In this manner, the drawing-up of the raw material liquid in the auxiliary storage portion 124 by the second gutter-shaped members 123c is repeated.

Afterward, when the liquid level in the auxiliary storage portion 124 rises and exceeds the auxiliary partition wall portion 127, the raw material liquid overflows and is received in the center of the bottom portion 116 of the agitation vessel 110, which is located in the lower level. At this time, the raw material liquid overflowing the auxiliary storage portion 124 moves over the outer circumference of the auxiliary storage portion 124, flows down from the protruding portion 129 onto the heat source 112b in a dripping manner, for example, and is received in the center of the bottom portion 116 of the agitation vessel 110.

Furthermore, due to the rotation of the rotating shaft 121, the raw material liquid received in the center of the bottom portion 116 of the agitation vessel 110 is drawn up from the lower end to the upper end of the first gutter-shaped members 123b via flow passages 126b in the respective first gutter-shaped members 123b of the liquid distributing portion 120b, and then distributed from upper end portions of the first gutter-shaped members 123b toward the protruding portion 129 of the auxiliary storage portion 124. After that, the raw material liquid again flows down the heat source 112b from the protruding portion 129, an additional portion of the volatile component contained in the raw material liquid is evaporated by the heat source 112b, and the residue flows down the heat source 112b as is and is again received in the center of the bottom portion 116 of the agitation vessel 110 as the raw material liquid. In this manner, the drawing-up of the raw material liquid in the center of the bottom portion 116 by the first gutter-shaped members 123b is repeated.

As a result of the drawing-up being repeated as described above, the raw material liquid (also referred to as a concentrate) containing a large amount of a nonvolatile component rather than the volatile component is contained in the center of the bottom portion 116 of the agitation vessel 110. Thus, the obtained concentrate is finally discharged to the outside through the concentrate outlet 115.

In the embodiment shown in FIG. 4, the evaporator 200 including two gutter-shaped members that are arranged in the vertical direction as the liquid distributing portions arranged in two levels has been described. However, the present invention is not limited to this. For example, the evaporator may also include three gutter-shaped members that are arranged in the vertical direction, that is, may be constituted by liquid distributing portions arranged in three levels, or may also include four or more gutter-shaped members that are arranged in the vertical direction, that is, may be constituted by liquid distributing portions arranged in four or more levels.

With the evaporator 200 shown in FIG. 4, the bottom portion 116 of the agitation vessel 110 and the auxiliary storage portion 124 can individually receive raw material liquid at different volatile component concentrations, and thus, the evaporation efficiency can be improved.

Figure 5:
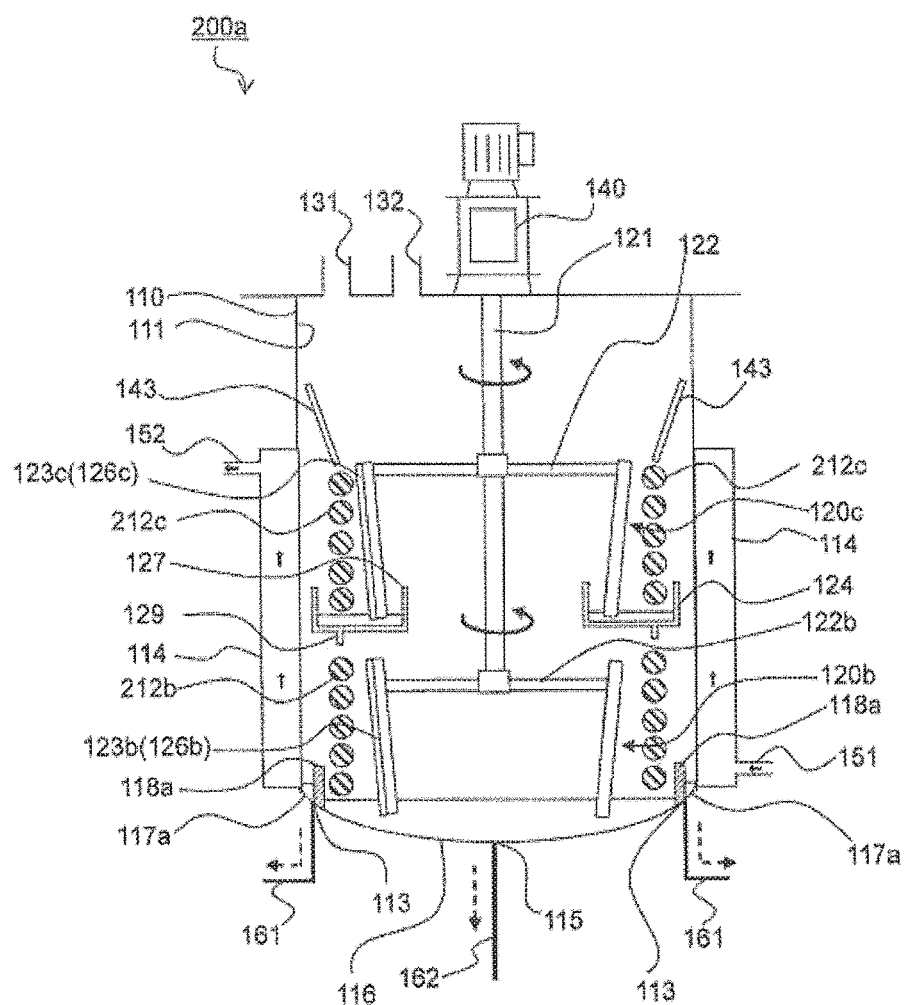
FIG. 5 is a schematic diagram showing yet another example of the evaporator of the present invention.

FIG. 5 is a schematic diagram showing yet another example of the evaporator of the present invention.

In an evaporator 200a shown in FIG. 5, constituent elements denoted by the same reference numerals as those shown in the above-described drawings are the same as those shown in the above-described drawings.

The evaporator 200a of the present invention shown in FIG. 5 includes, as is the case with the evaporator shown in FIG. 4, the liquid distributing portions 120b and 120c that are arranged in two levels in the up-down direction, and also includes heat sources 212b and 212c constituted by coiled heaters, instead of the heat sources 112b and 112c that are shown in FIG. 4 and that are arranged in two levels. Since the heat sources 112b and 112c are coil-shaped, the area of their heat-providing surfaces can be increased even more compared with that shown in FIG. 4. Furthermore, the raw material liquid flowing down the heat sources 212b and 212c can also freely move between the coil loops constituting the heat sources 212b and 212c. Consequently, the volatile component of the raw material liquid can be more efficiently evaporated.

Figure 6:
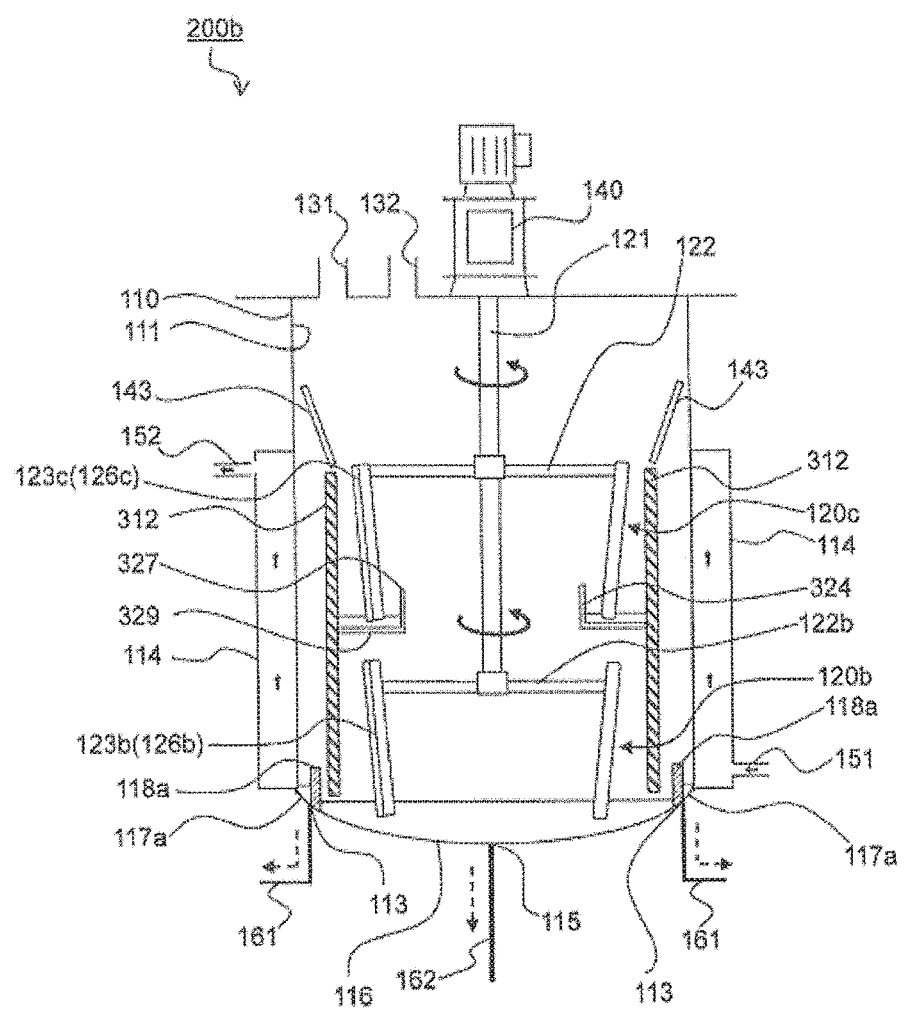
FIG. 6 is a schematic diagram showing yet another example of the evaporator of the present invention.

FIG. 6 is a schematic diagram showing yet another example of the evaporator of the present invention.

In an evaporator 200b shown in FIG. 6, constituent elements denoted by the same reference numerals as those shown in the above-described drawings are the same as those shown in the above-described drawings.

The evaporator 200b of the present invention shown in FIG. 6 includes, as is the case with the evaporator shown in FIG. 4, the liquid distributing portions 120b and 120c that are arranged in two levels in the up-down direction, and also includes a heat source 312 that is arranged in a single level for the liquid distributing portions 120b and 120c (i.e., a single continuously-extending heat source for the liquid distributing portions 120b and 120c), instead of the heat sources 112b and 112c that are shown in FIG. 4 and that are arranged in two levels. Furthermore, in the evaporator 200b, an auxiliary storage portion 324 is provided on a side of a middle portion of the heat source 312 that faces the central axis of the agitation vessel 110. The auxiliary storage portion 324 includes a bottom surface 329 connected to an inner surface (i.e., surface that is disposed facing the central axis of the agitation vessel 110) of the heat source 312 and extending from that inner surface toward the central axis of the agitation vessel 110, and an auxiliary partition wall portion 327 extending upward from an end portion of the bottom surface 329. In the auxiliary storage portion 324, a recess is formed by a portion of the heat source 312, the bottom surface 329, and the auxiliary partition wall portion 327, and the raw material liquid can be received in this recess.

In the evaporator 200b shown in FIG. 6, the raw material liquid discharged from the raw material liquid supply port 131 first comes into contact with the liquid flowing-down plate 143, and then flows down an upper portion of the heat source 312. At this time, a portion of the volatile component contained in the raw material liquid evaporates, and the residue flows down the heat source 312 as is and is then temporarily received in the auxiliary storage portion 324. Moreover, the residue that has flowed down an outer surface (i.e., surface that opposes the inner wall 111 of the agitation vessel 110) of the heat source 312 is received in the center of the bottom portion 116 of the agitation vessel 110.

The raw material liquid received in the auxiliary storage portion 324 is kept in contact with the heat source 312, and thus, the volatile component contained in the raw material liquid further evaporates.

Furthermore, due to the rotation of the rotating shaft 121, the raw material liquid received in the auxiliary storage portion 324 is drawn up from the lower end to the upper end of the second gutter-shaped members 123c via the flow passages 126c in the respective second gutter-shaped members 123c of the liquid distributing portion 120c, then distributed over the liquid flowing-down plate 143 from the upper end portions of the second gutter-shaped members 123c, and caused to flow down. While the raw material liquid flows down, an additional portion of the volatile component contained in the raw material liquid evaporates on an upper portion of the heat source 312, and the residue flows down the heat source 312 as is and is again received in the auxiliary storage portion 324 as the raw material liquid. In this manner, the drawing-up of the raw material liquid in the auxiliary storage portion 324 by the second gutter-shaped members 123c is repeated.

Afterward, when the liquid level in the auxiliary storage portion 324 rises and exceeds the auxiliary partition wall portion 327, the raw material liquid overflows and is received in the center of the bottom portion 116 of the agitation vessel 110, which is located on the lower level.

Furthermore, due to the rotation of the rotating shaft 121, the raw material liquid received in the center of the bottom portion 116 of the agitation vessel 110 is drawn up from the lower end to the upper end of the first gutter-shaped members 123b via the flow passages 126b in the respective first gutter-shaped members 123b of the liquid distributing portion 120b, and then distributed from the upper end portions of the first gutter-shaped members 123b toward, for example, the bottom surface 329 of the auxiliary storage portion 324 or a portion where the bottom surface 329 and the heat source 312 intersect with each other. After that, the raw material liquid flows down the heat source 312 again, an additional portion of the volatile component contained in the raw material liquid is evaporated by the heat source 312, and the residue flows down the heat source 312 as is and is again received in the center of the bottom portion 116 of the agitation vessel 110 as the raw material liquid. In this manner, the drawing-up of the raw material liquid in the center of the bottom portion 116 by the first gutter-shaped members 123b is repeated.

As a result of the drawing-up being repeated as described above, a concentrate containing a large amount of a non-volatile component rather than the volatile component is contained in the center of the bottom portion 116 of the agitation vessel 110. Thus, the obtained concentrate is finally discharged to the outside through the concentrate outlet 115.

In the embodiments respectively shown in FIGS. 5 and 6, the evaporators 200a and 200b including two gutter-shaped members that are arranged in the vertical direction as the liquid distributing portions arranged in two levels have been described. However, the present invention is not limited to these. For example, the evaporator may also include three gutter-shaped members that are arranged in the vertical direction, that is, may be constituted by liquid distributing portions arranged in three levels, or may also include four or more gutter-shaped members that are arranged in the vertical direction, that is, may be constituted by liquid distributing portions arranged in four or more levels.

Figure 7:
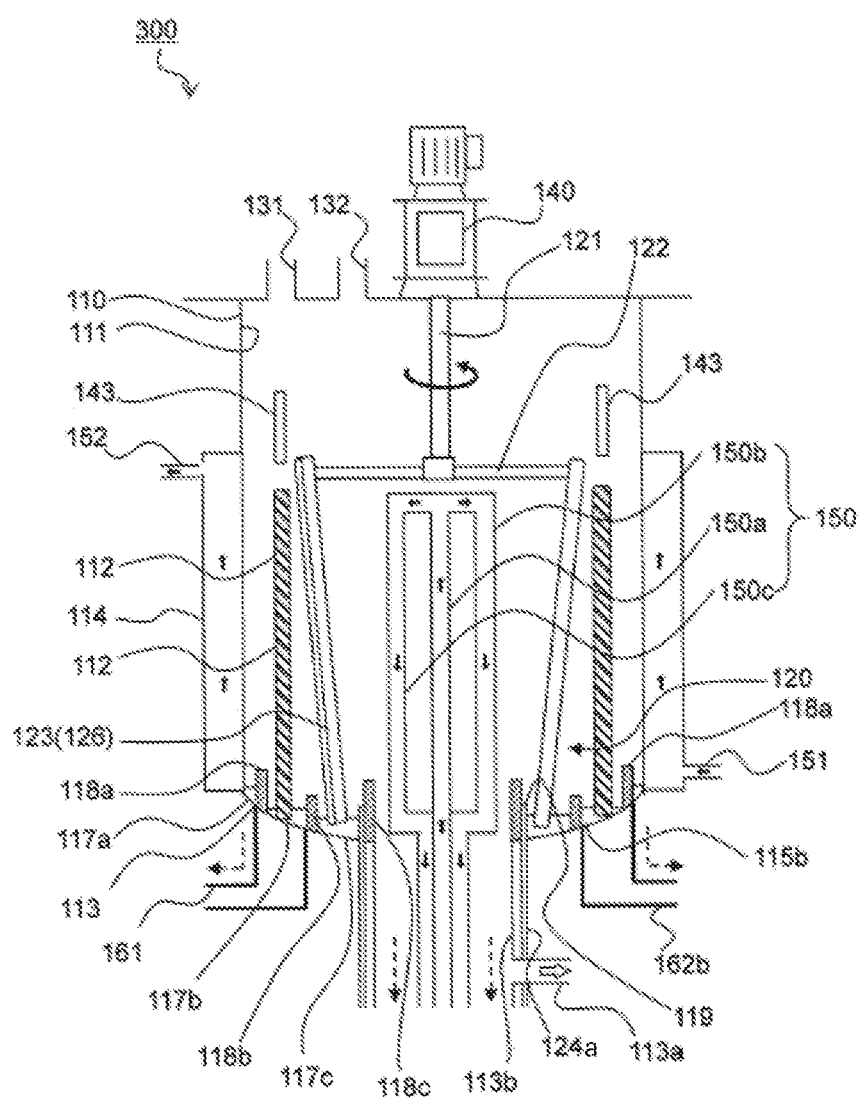
FIG. 7 is a schematic diagram showing yet another example of the evaporator of the present invention, and shows an evaporator in which, inside the agitation vessel, a second condenser is provided inward of a rotation path of the liquid distributing portion.

FIG. 7 is a schematic diagram showing yet another example of the evaporator of the present invention.

In an evaporator 300 shown in FIG. 7, constituent elements denoted by the same reference numerals as those shown in the above-described drawings are the same as those shown in the above-described drawings.

In the evaporator 300 shown in FIG. 7, a concentrate outlet 115b is provided in communication with, for example, a bottom portion of a first raw material liquid receiving portion 117b in the agitation vessel 110. The first raw material liquid receiving portion 117b is surrounded by the bottom portion of the agitation vessel 110 (more specifically, a portion of the bottom portion of the agitation vessel 110), the outer partition wall portion 118a, and an intermediate partition wall portion 118b, and is open at the top. The first raw material liquid receiving portion 117b can receive the raw material liquid that has flowed down from the heat source 112, and the raw material liquid from which the volatile component has been removed can be discharged to the outside as a concentrate from a conduit 162b via the concentrate outlet 115b. The conduit 162b may also be provided with a valve (not shown), if necessary, and, for example, in a state in which the valve is closed, the above-described concentrate can be temporarily received in the first raw material liquid receiving portion 117b.

Furthermore, in the evaporator 300 of the present invention, a second raw material liquid receiving portion 117c is also provided in the bottom portion of the agitation vessel 110. The second raw material liquid receiving portion 117c is surrounded by the bottom portion of the agitation vessel 110 (more specifically, a portion of the bottom portion of the agitation vessel 110), the intermediate partition wall portion 118b, and an inner partition wall portion 118c, and is open at the top. In FIG. 7, the second raw material liquid receiving portion 117c is provided with a raw material liquid outlet 119 such that the raw material liquid outlet 119 is open at a position below an upper end portion of the inner partition wall portion 118c.

In the evaporator 300 of the present invention, when the amount of raw material liquid that is received in the second raw material liquid receiving portion 117c increases (FIG. 8), and the second raw material liquid receiving portion 117c is completely filled with the raw material liquid (FIG. 9), the raw material liquid can overflow and be discharged to the outside of the agitation vessel 110 from a raw material liquid discharge conduit 124a through the raw material liquid outlet 119, before flowing over the inner partition wall portion 118c.

Referring again to FIG. 7, in the evaporator 300 of the present invention, the above-described volatile component receiving portion 117a, first raw material liquid receiving portion 11M, and second raw material liquid receiving portion 117c are arranged in this order from an outer edge toward the center of the bottom portion of the agitation vessel 110. Furthermore, in the present invention, it is preferable that the upper end portion of the outer partition wall portion 118a is provided at a position above the upper end portion of the intermediate partition wall portion 118b, and the upper end portion of the intermediate partition wall portion 118b is provided at a position below the upper end of the inner partition wall portion 118c (or the position at which the raw material liquid outlet 119 is open). With this configuration, for example, even when the amount of concentrated raw material liquid (concentrate) received in the first raw material liquid receiving portion 117b increases, the concentrate flows over the intermediate partition wall portion 118b and is received in the second raw material liquid receiving portion 117c, before flowing over the outer partition wall portion 118a. Moreover, even when the amount of raw material liquid received in the second raw material liquid receiving portion 117c increases, the raw material liquid is discharged to the outside of the agitation vessel 110 from the raw material liquid discharge conduit 124 through the raw material liquid outlet 119, before flowing over the intermediate partition wall portion 118b. As a result, both the possibility of the concentrate and the raw material liquid that have overflowed from the first raw material liquid receiving portion 117b flowing into the volatile component receiving portion 117a and the possibility of the raw material liquid that has overflowed from the second raw material liquid receiving portion 117c flowing into the first raw material liquid receiving portion 117b can be avoided.

Furthermore, in the evaporator 300 of the present invention, as shown in FIG. 7, inside the agitation vessel 110, a second condenser 150 is provided inward of a rotation path of the liquid distributing portion 120. Here, the term "rotation path of the liquid distributing portion" as used herein refers to a space defined by the path of a gutter-shaped member constituting the liquid distributing portion, the path being able to be formed by the gutter-shaped member in accordance with the rotation of the rotating shaft. That is to say, in FIG. 7, the second condenser 150 is disposed between the two gutter-shaped members 123.

The second condenser 150 includes a cooling main conduit 150a through which a cooling medium such as cooling water flows from the outside toward the inside of the agitation vessel 110, and cooling branch conduits 150b and 150c which branch from the cooling main conduit 150a and through which the cooling medium flows from the inside toward the outside of the agitation vessel 110. In the evaporator 300 of the present invention, it is preferable that the second condenser 150 is provided inside the agitation vessel 110 in such a manner as to be substantially parallel to the inner wall 111 (i.e., in such a manner that the cooling branch conduits 150b and 150c are each substantially parallel to the inner wall 111).

Furthermore, in the distillation device 300 of the present invention, for example, the inner wall 111 of the agitation vessel 110, the heat source 112, and the second condenser 150 are provided in the vertical direction so as to be substantially parallel to one another, and may also be provided such that the shortest distance from the inner wall 111 to the heat source 112 and the shortest distance from the heat source 112 to the second condenser 150 are substantially equal to each other. This is because the composition of the volatile component that is obtained through condensation on the inner wall 111 and the second condenser 150, respectively, can be easily kept substantially uniform.

The volatile component of the raw material liquid that has evaporated on the heat source 112 is cooled on the cooling branch conduits 150b and 150c, condenses, and flows down the cooling branch conduits 150b and 150c as liquid droplets. On the other hand, a second volatile component outlet 113b for discharging the liquid droplets falling from the second condenser 150 to the outside is provided in the bottom portion of the agitation vessel 110 and below the second condenser 150. A branch conduit 113a coupled to a vacuum pump (not shown) is provided in a portion of the second volatile component outlet 113b, and the pressure inside the agitation vessel 110 is reduced through the branch conduit 113a. The liquid droplets that have flowed down from the second condenser 150 are discharged to the outside through the volatile component outlet 113b.

After that, the streams of the volatile component discharged from the individual volatile component outlets 113 and 113b may be combined into a single stream, if necessary, and received in a predetermined collection tank.

According to the evaporator 300 of the present invention as well, unlike a conventional inner wall, the inner wall is not heated. For this reason, when the operation of the evaporator is to be stopped, the operation can be stopped in a relatively short period of time without the need to be concerned about seizure of the inner wall of the agitation vessel with the raw material liquid. Also, according to the evaporator 300 of the present invention, it is easy to stop the evaporator itself compared with a conventional evaporator in which the raw material liquid passes down the inner wall in the agitation vessel by flowing down only once through "one path", and the amount of raw material liquid that is used for cooling when the evaporator is to be stopped can also be reduced.

FIG. 10 is a schematic diagram showing yet another example of the evaporator of the present invention.

In an evaporator 300a shown in FIG. 10, constituent elements denoted by the same reference numerals as those shown in the above-described drawings are the same as those shown in the above-described drawings.

The evaporator 300a of the present invention shown in FIG. 10 includes, instead of the first raw material liquid receiving portion 117b and the second raw material liquid receiving portion 117c shown in FIG. 7, a raw material liquid receiving portion 217b that is surrounded by the bottom portion of the agitation vessel 110, the outer partition wall portion 118a, and an inner partition wall portion 218c and that is in communication with a concentrate discharge conduit 224 via a concentrate outlet 219.

In the evaporator 300a shown in FIG. 10, the raw material liquid supplied from the raw material liquid supply port 131 first comes into contact with the liquid flowing-down plate 143, and then flows down the heat source 112. At this time, a portion of the volatile component contained in the raw material liquid evaporates, and the residue flows down the heat source 112 as is and is then temporarily received in the raw material liquid receiving portion 217b as the raw material liquid. Subsequently, due to the rotation of the liquid distributing portion 120, the raw material liquid received in the raw material liquid receiving portion 217b is drawn up from the lower end to the upper end of the gutter-shaped members 123, and discharged toward the liquid flowing-down plate 143. The raw material liquid that has flowed down the liquid flowing-down plate 143 then flows down from the upper end of the heat source 112, preferably along its heat-providing surfaces on both sides, and meanwhile, an additional portion of the volatile component of the raw material liquid vaporizes and evaporates. After the volatile component has evaporated, the residue continues on to flow down the heat source 112 as the raw material liquid, and is received in the raw material liquid receiving portion 217b again. Then, when the amount of raw material liquid received in the receiving portion 217b increases, and the receiving portion 217b is completely filled with the raw material liquid, the raw material liquid can overflow and be discharged to the outside of the agitation vessel 110 as a concentrate through the concentrate discharge conduit 224 via the concentrate outlet 219, before flowing over the inner partition wall portion 218c.

On the other hand, the volatile component that has vaporized on the heat source 112 condenses on the inner wall 111, which is cooled via the first condenser 114, and then flows down the inner wall 111 as liquid droplets of the volatile component. After that, the volatile component of the raw material liquid that has flowed down the inner wall 111 is received in the volatile component receiving portion 117a and discharged to the outside from the conduit 161 through the volatile component outlet 113. Furthermore, the volatile component that has vaporized on the heat source 112 is also cooled on the second condenser 150 (i.e., cooling branch conduits 150b and 150c), condenses, and flows down the cooling branch conduits 150b and 150c as liquid droplets. Then, the liquid droplets that have flowed down from the second condenser 150 are discharged to the outside from the second volatile component outlet 113b, through the second volatile component outlet 113b that is provided in the bottom portion of the agitation vessel 110 and below the second condenser 150.

After that, the streams of the volatile component discharged from the individual volatile component outlets 113 and 113b may be combined into a single stream, if necessary, and received in a predetermined collection tank.

FIG. 11 is a schematic diagram showing yet another example of the evaporator of the present invention.

In an evaporator 300b shown in FIG. 11, constituent elements denoted by the same reference numerals as those shown in the above-described drawings are the same as those shown in the above-described drawings.

The evaporator 300b of the present invention shown in FIG. 11 includes, instead of the hollow heat source 112 shown in FIG. 7, a heat source 412 constituted by a coiled heater. Since the heat source 412 is coil-shaped, the area of its heat-providing surface can be increased even more compared with that shown in FIG. 7. Furthermore, the raw material liquid that has flowed down from the liquid flowing-down plate 143 can also freely move between the coil loops constituting the heat source 412. Furthermore, the volatile component that has evaporated on the heat source 412 can also freely move between the coil loops and thus can be condensed by both the first condenser 114 and the second condenser 150. As a result, the volatile component of the raw material liquid can be more efficiently evaporated.

FIG. 12 is a diagram schematically showing an evaporation system including the evaporator 300 of the present invention shown in FIG. 7.

An evaporation system 500 of the present invention includes a raw material tank 910 configured to contain a raw material liquid serving as a raw material and the evaporator 300 of the present invention. Furthermore, in addition to these, the evaporation system 500 shown in FIG. 12 also includes a vacuum pump 920.

The raw material liquid is caused to flow from the raw material tank 910 to a preheater 906 through a conduit 904 by driving of a pump 902, temporarily preheated in the preheater 906, and then fed to the evaporator 300. The heat source (not shown) within the distillation device 300 is heated by steam (STM) supplied through a conduit 905. A volatile component evaporated in the evaporator 300 is condensed by the first and second condensers (not shown) within the evaporator. Then, the volatile component that has condensed by the first condenser (more specifically, condensed on the inner wall via the first condenser) is discharged to the outside from the conduit 161 via the volatile component outlet (113 in FIG. 7). On the other hand, the volatile component that has condensed by the second condenser is discharged to the outside from a conduit 922 via the volatile component outlet (113b in FIG. 7). The pressure inside the evaporator 300 is reduced by the vacuum pump 920, which is provided outside.

As described above, the evaporation system 500 of the present invention shown in FIG. 12 can have a more space-saving configuration without having to separately provide a condenser in the system.

It should be noted that although the evaporator 300 shown in FIG. 7 is used in FIG. 12, the system of the present invention may also use, for example, any of the above-described evaporators 100, 100a, 200, 200a, 200b, 300a, and 300b of the present invention, instead of the evaporator 300. In this case, the number of conduits connected to a volatile component outlet can be appropriately adjusted by a person skilled in the art in accordance with the type of the evaporator that is used.

The evaporator of the present invention is useful in, for example, the purification and concentration of a liquid containing impurities (for example, methyl ester, lactic acid, fish oil, oils and fats, and glycerin); the removal of water, ethanol, methyl ethyl ketone (MEK), N-methyl pyrrolidone (NMP), hexane, toluene, acetone, ethylene glycol, and the like contained in chemical products such as ink, paints, and chemicals; and the removal of volatile impurities from monomers, polymers, and the like that are used in the fields of paint production and resin production.

LIST OF REFERENCE NUMERALS

100, 200, 300 evaporator
10 agitation vessel
111 inner wall
112, 112a, 312, 412 heat source
113, 113b volatile component outlet
114 first condenser
115 concentrate outlet
116 bottom portion
117a volatile component receiving portion
117b first raw material liquid receiving portion
117c second raw material liquid receiving portion
118a partition wall portion
118b intermediate partition wall portion
118c inner partition wall portion
120 liquid distributing portion
121 rotating shaft
122 attachment member
123 gutter-shaped member
124 auxiliary storage portion
124a liquid discharge conduit
126 flow passage
131 raw material liquid supply port
140 motor
150 second condenser
500 evaporation system

The invention claimed is:

1. An evaporator comprising:
   an agitation vessel having a raw material liquid supply port, a volatile component outlet, and a concentrate outlet and being configured to receive a raw material liquid;
   a heat source provided inside the agitation vessel;
   a liquid distributing portion provided within the agitation vessel and configured to cause the raw material liquid to flow down the heat source; and
   a first condenser provided on an outer circumference of the agitation vessel and configured to cool an inner wall of the agitation vessel,
   wherein the agitation vessel includes a volatile component receiving portion configured to receive a volatile component of the raw material liquid, the volatile component receiving portion being surrounded by a bottom portion of the agitation vessel, the inner wall, and an outer partition wall portion and being in communication with the volatile component outlet, and
   the liquid distributing portion is constituted by a rotating shaft and at least one gutter-shaped member having a flow passage through which, as the rotating shaft rotates, the raw material liquid flows upward from a lower side of the agitation vessel, and the at least one gutter-shaped member being mounted to the rotating shaft.

2. The evaporator according to claim 1, wherein the agitation vessel includes:
   a first raw material liquid receiving portion configured to receive the raw material liquid that has flowed down from the heat source, the first raw material liquid receiving portion being surrounded by the bottom portion of the agitation vessel, the outer partition wall portion, and an intermediate partition wall portion and being in communication with the concentrate outlet; and
   a second raw material liquid receiving portion configured to receive the raw material liquid that has overflowed from the first raw material liquid receiving portion, the second raw material liquid receiving portion being surrounded by the bottom portion of the agitation vessel, the intermediate partition wall portion, and an inner partition wall portion, and
   the volatile component receiving portion, the first raw material liquid receiving portion, and the second raw material liquid receiving portion are arranged in this order from an outer edge toward the center of the bottom portion of the agitation vessel.

3. The evaporator according to claim 1, wherein the agitation vessel includes:
   a raw material liquid receiving portion configured to receive the raw material liquid that has flowed down from the heat source, the raw material liquid receiving portion being surrounded by the bottom portion of the agitation vessel, the outer partition wall portion, and an inner partition wall portion and being in communication with the concentrate outlet, and
   the volatile component receiving portion and the raw material liquid receiving portion are arranged in this order from an outer edge toward the center of the bottom portion of the agitation vessel.

4. The evaporator according to claim 2, further comprising a second condenser that is provided inward of a rotation path of the liquid distributing portion inside the agitation vessel.

5. The evaporator according to claim 4, wherein, in the bottom portion of the agitation vessel, a second volatile component outlet is provided below the second condenser.

6. The evaporator according to claim 5, wherein the inner wall of the agitation vessel, the heat source, and the second condenser are provided in a vertical direction substantially parallel to one another, and the shortest distance from the inner wall to the heat source and the shortest distance from the heat source to the second condenser are substantially equal to each other.

7. The evaporator according to claim 2, wherein the second raw material liquid receiving portion is provided with a raw material liquid discharge conduit that is open at a position below an upper end portion of the inner partition wall portion.

8. The evaporator according to claim 1, wherein the at least one gutter-shaped member has a pair of gutter-shaped members that are mounted to the rotating shaft via an attachment member extending in a direction that is perpendicular to an axial direction of the rotating shaft, and the gutter-shaped members form substantially equal angles with the attachment member.

9. An evaporation system comprising:
a raw material tank configured to supply the raw material liquid; and
the evaporator according to claim 1, which is configured to process the raw material liquid supplied from the raw material tank.

* * * * *